INVENTOR
C. L. KRUMREICH
BY Harry L. Newman
ATTORNEY

United States Patent Office 3,444,329
Patented May 13, 1969

3,444,329

TELEPHONE SET

Charles L. Krumreich, Indianapolis, Ind., assignor to Bell Telephone Laboratories, Incorporated, New York, N.Y., a corporation of New York Filed Oct. 27, 1965, Ser. No. 505,374
Int. Cl. H04m *1/02*
U.S. Cl. 179—100 3 Claims

ABSTRACT OF THE DISCLOSURE

A telephone set includes a handset and a base each having a socket at one end thereof, only the entrance of each socket being exposed. The handset cord is provided with a plug at each end thereof that is accommodated by the socket and each plug has a detent that cooperates with the associated socket to latch the plug in place. The plugs when latched blend with the base and handset to conceal their presence.

This invention pertains to station apparatus and particularly to telephone sets comprising a hand held mobile component, commonly referred to as a handset, and a relatively stationary component, commonly referred to as a base, the base being adapted to accommodate the handset when it is not being used.

The handset is electrically connected to the base by means of a handset cord that comprises a plurality of insulated conductors encased within an insulating sheath. Similarly, the base is electrically connected to a telephone line by means of a line cord comprising a plurality of insulated conductors encased within an insulating sheath.

Heretofore, the conductors in the handset cord and the line cord have been terminated by means of spade tips or similar terminals and electrically connected to the circuitry and components contained within the handset and the base by means of these terminals, the terminals being typically captured beneath the heads of screw terminals mounted within the handset and base. With this arrangement, the handset cord and the line cord are electrically connected to the handset and the base as the handset and base are assembled, the line cord, base, handset cord, and handset being assembled together as a unit by the manufacturer.

As a result, telephone companies have stocked the line cord, base, handset cord, and handset as a unit rather than individual components. Since the same handset, handset cord, and line cord are often employed in combination with many different bases, this has led to the maintenance of inventories in these three components at what is probably inefficient levels. Similarly, the telephone installer in stocking a variety of telephone sets on his truck has had to carry what actually amounts to a large number of duplicate components.

Furthermore, as a result of this treatment of the line cord, base, handset cord, and handset as a unit, if, for example, a handset has proven to be defective, or the handset cord has become worn, or the subscriber has decided to have a handset cord longer than standard installed, either the entire telephone set has had to be replaced or it has had to be partially disassembled to replace the particular component.

An object of this invention is to provide a telephone set in which the line cord, base, handset cord, and handset are individual units that can be joined to and separated from one another without disassembling any of the units.

Actually this object is carried out in the very earliest telephone sets, as illustrated by Patent No. 283,747, now Patent No. 3,306,734 issued to W. A. Belcher on Aug. 28, 1883. This patent discloses a wall telephone having a pair of binding screws mounted on the side of the base to which one end of a telephone cord is connected and another pair of binding screws mounted on the top of the receiver to which the other end of the telephone cord is connected. The major disadvantage with this arrangement is that the connections between the receiver cord and base are exposed and, therefore, besides being a shock hazard, are subject to tampering and/or inadvertent separation.

Thus another object of this invention is to join the line cord and handset cord with the base and the handset cord to the handset in a manner whereby the telephone set has substantially the same appearance as telephone sets in which the line cord, base, handset cord and handset are treated as a unitary structure.

A further object of this invention is to join the line cord and handset cord to the base and the handset cord to the handset in a manner to prevent inadvertent separation thereof.

These and other objects of this invention are achieved in an illustrative embodiment thereof wherein the base of the telephone set has a socket in the underside thereof and a socket in one end thereof and the handset has a socket in one end thereof. The line cord is provided with a plug at one end thereof that is accommodated only by the socket in the underside of the base, and when the plug is properly seated in this socket the entire plug is positioned within the socket, whereby it is concealed.

The handset cord is provided with a plug at each end thereof, one plug being accommodated by the socket in the end of the handset and the other plug being accommodated by the socket in the end of the base. These plugs while not fully enclosed by their associated sockets are each provided with a grommet at their exposed end, each grommet being at the juncture between the plug and the cord. The grommets are shaped to respectively blend with the base and the handset when the plugs are inserted in their respective sockets, and these plugs are thereby also concealed.

All three plugs are provided with detents that cooperate with the individual sockets to latch each plug in place when it is properly seated in its associated socket. Each detent is of a design to permit its release by means of a standard tool carried by all telephone service men.

With this arrangement, a telephone company need only inventory the quantity of each of these components that reflects the true demand for each component. In addition, the installer carries these components loose and makes up a complete telephone set to the subscriber's order when at the subscriber's premises. Finally, if for any reason one of these components needs to be replaced, it is replaced on the subscriber's premises with only that individual component being replaced and the rest of the components remaining.

A complete understanding of the invention and of these and other features and advantages thereof may be gained from consideration of the following detailed description which in conjunction with the accompanying drawing discloses one embodiment of the invention. It is to be expressly understood, however, that the drawing and description are not to be construed as defining the limits of the invention.

Figure 1:
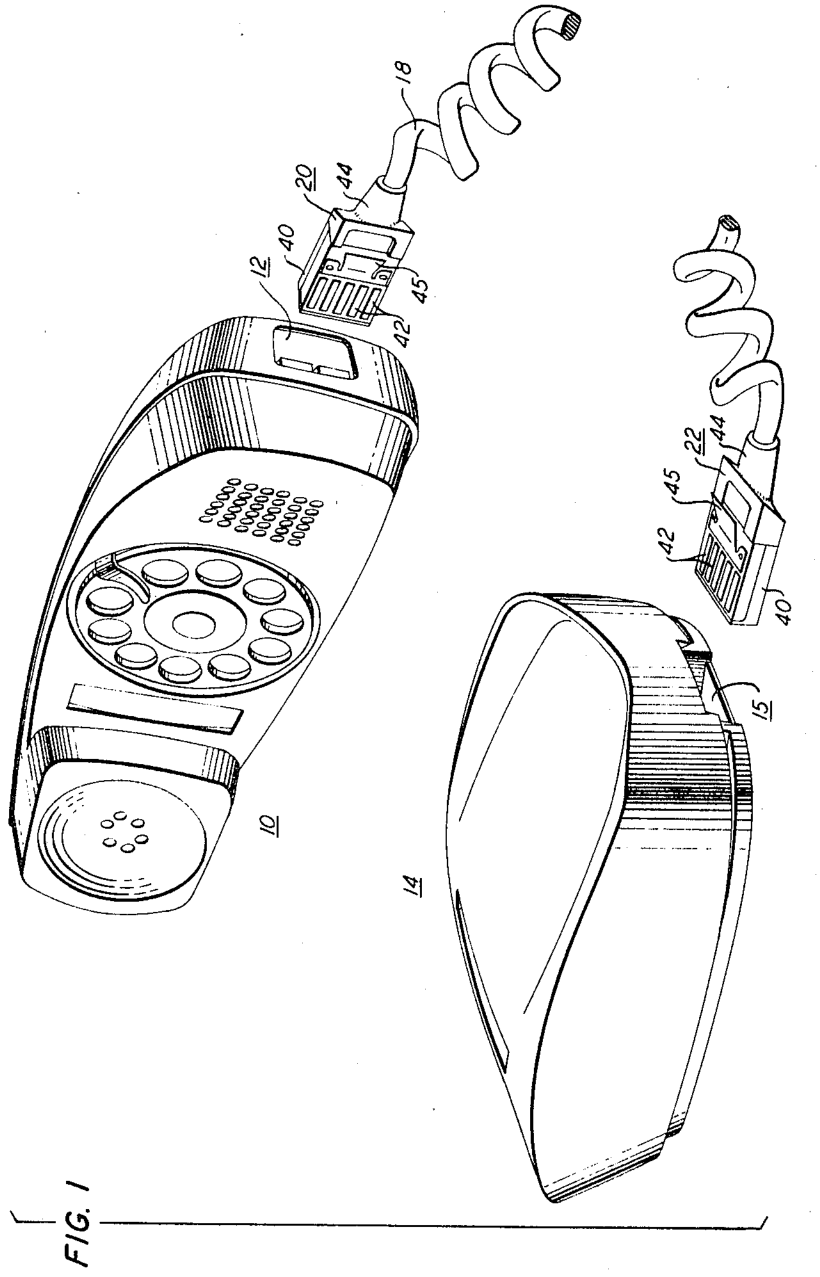
FIG. 1 is an exploded perspective view of the telephone set showing the handset, handset cord, and base as unitary components.
Figure 2:
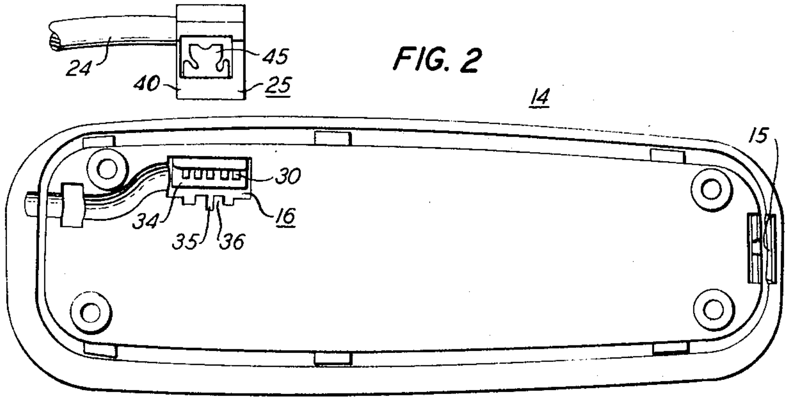
FIG. 2 is an exploded perspective view of the telephone set showing the base and line cord as unitary components.

Referring to the drawing and FIGS. 1 and 2 in particular, the telephone set comprises a handset 10 that has a socket 12 in one end thereof and a base 14 that has both a socket 15 in one end thereof and a socket 16 in the underside thereof. A handset cord 18 electrically connects the handset 10 to the base 14, the handset cord being terminated at one end by a plug 20 that is accommodated by the socket 12 and terminated at the other end by a plug 22 that is accommodatad by the socket 15. In addition, a line cord 24 electrically connects the base 14 to a telephone line, the line cord being terminated at one end by a plug 25 that is accommodated by the socket 16.

Figures 3A, 3B:
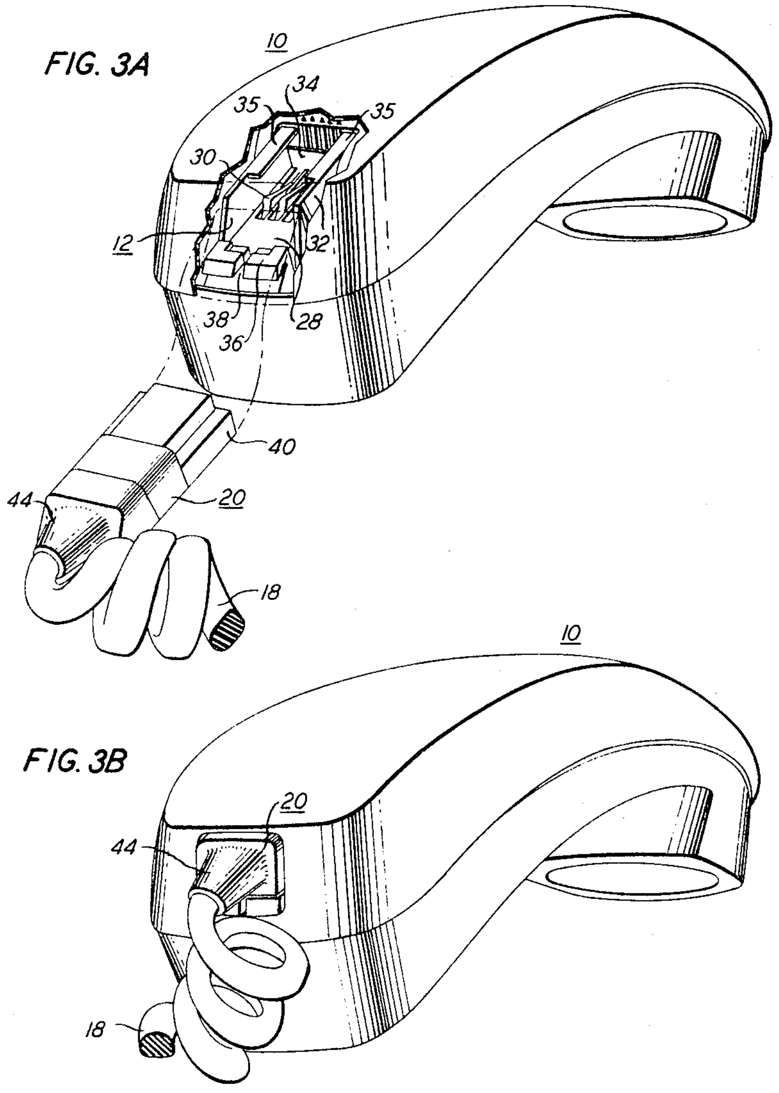
FIG. 3A is an enlarged perspective view with portions broken away of the socket in one end of the handset and the plug on one end of the handset cord that is accommodated by the socket.
FIG. 3B is an enlarged perspective view showing the plug inserted into the socket.
Figure 4A:
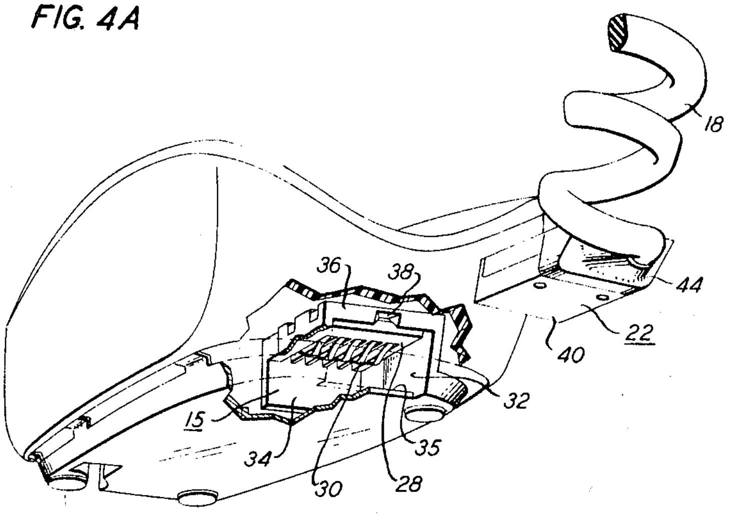
FIG. 4A is an enlarged perspective view of the socket in one end of the base and the plug on the other end of the handset cord that is accommodated by the socket.
Figure 5A:
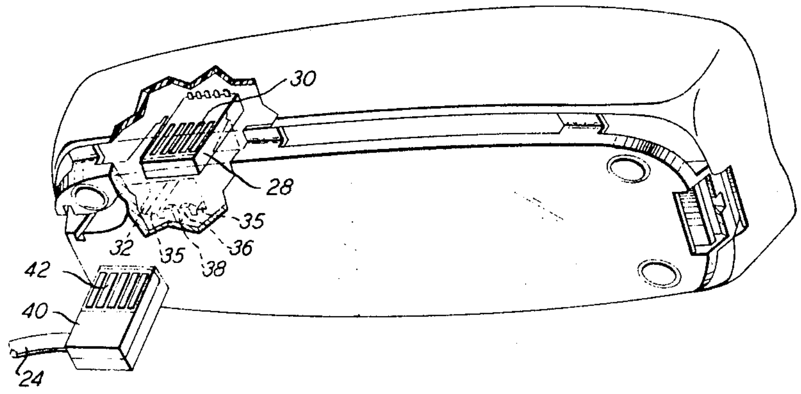
FIG. 5A is en enlarged perspective view of the socket in the underside of the base and the plug on the end of the line cord that is accommodated by the socket.

As shown in FIGS. 3A, 4A, and 5A, each of the sockets 12, 15, and 16 are basically the same. Each includes a dielectric support 28 having a plurality of contact members 30 mounted therein that are electrically connected to the elements contained within the unit with which the socket is associated. The contact members 30 are spaced along a line that is generally parallel to the socket entrance and they extend normal to the entrance.

A pair of sides 32 and a back 34 extend normal to the support 28, and a ledge 35 extends from the sides parallel to and a spaced distance from the support. The ledge 35 is continuous in the socket 15, but not interrupted in the sockets 12 and 16. The sides 32, back 34, and ledge 35 in conjunction with the support 28 define a rectangular cavity into which the contact members protrude. This rectangular cavity differs in depth and/or height in each socket.

Each of the sockets 12, 15, and 16 further includes a ridge 36 that is adjacent to and extends generally parallel to the socket entrance and a channel 38 that extends through the ridge normal to the entrance. The ridge 36 extends from the general plane of the support 28 in the sockets 12 and 15, but extends from the general plane of the ledge 35 in the socket 15.

As illustrated in FIGS. 1 and 2, each of the plugs 20, 22, and 25 are also basically the same. Each plug comprises a rectangular housing 40 of a size to substantially fill the cavity of the socket with which the plug is associated, and since the cavities vary in size, the housings vary in size to conform to the cavity adapted to accommodate it. By this means each plug is keyed to an individual socket.

Each housing 40 has a plurality of contact members 42 mounted therein. The contact members are spaced along a line that is parallel to the leading end of the housing 40, and each contact portion includes a portion that extends exteriorly of the housing normal to the leading end thereof. Thus when the housing 40 is inserted into its associated cavity, the exterior portions of the contact members 42 respectively engage the portions of the contact members 30 that protrude into the cavity, whereby an electrical connection is provided between the contact members. The contact members 42 are each electrically connected to individual conductors of the cord with which the plug is associated, the cord extending into the interior of the housing. Means (not shown) provided within the housing 40 secure the cord therewithin and prevent tension on the cord from being transmitted to the contact members.

In the plugs 20 and 22, the handset cord 18 extends into the housing 40 through a resilient grommet 44 secured to the trailing end of the housing. As hereinafter explained, the grommet 44 in addition to its automatic function of serving to prevent severe bending of the handset cord 18 at the juncture of the cord with the housing 40 also serves to conceal the plugs 20 and 22. In the plug 25, the line cord 24 extends into the housing 40 through an opening in the side thereof and for reasons hereinafter explained, no grommet is needed.

Each of the plugs 20, 22, and 25 further has a detent 45 that is secured to the exterior of the housing 40 intermediate the leading and trailing ends of the housing. The detent 45, which advantageously comprises a spring member, is secured at one end and extends toward the trailing end of the housing, the free end of the detent being biased away from the housing whereby it is normally spaced from the housing. In the plugs 20 and 22 the detent 45 is on the same side of the housing as the exposed portions of the contact members 42, while at the plug 25 the detent is on the opposite side of the housing.

For each plug the distance between the trailing edge of the detent 45 and the leading end of the housing 40 is selected to be slightly less than the distance between the back 34 and the ridge 36 of the socket adapted to accommodate the plug. In addition, the distance between the trailing edge of the detent 45 and the side of the housing opposite to that to which the detent is secured is normally significantly greater than the height of the cavity adapted to accommodate the plug.

Figure 6:
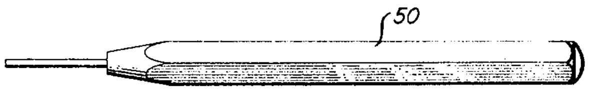
FIG. 6 is a plan view of a tool commonly carried by the telephone service man.

Thus as a plug is inserted into its associated socket, the detent 45 is deflected toward the housing 40 by the ridge 36 of the socket, and when the plug is fully inserted into the socket with the leading end of the housing abutting the back 34 of the socket, the detent moves behind the ridge and latches the plug within the socket. To remove a plug from its associated socket it is necessary to insert a stiff wire through the channel 38 in the ridge 36 and deflect the detent against the housing 40. Then by pulling on the cord attached to the plug and maintaining the detent 45 in a deflected condition, the plug is extracted from the socket. Telephone service men commonly carry the tool 50 shown in FIG. 6 and this can be conveniently used to deflect the detent.

Figure 4B:
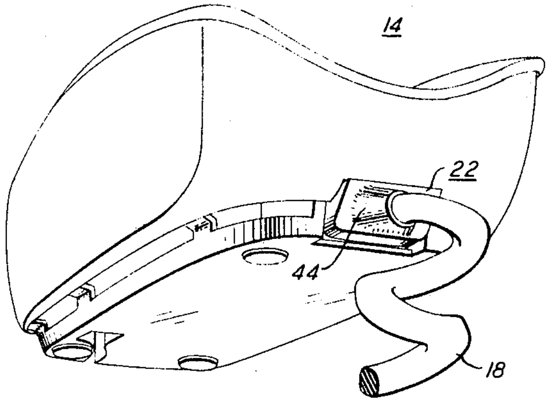
FIG. 4B is an enlarged perspective view showing the plug inserted into the socket.

Referring now to FIGS. 3B and 4B, it is seen that when the plugs 20 and 22 are fully inserted and latched within their respective sockets 12 and 15 only the trailing ends of the grommets 44 are exposed, the housings 40, contacts 42, and detents 45 being completely enclosed within the sockets. The grommets 44 are of a size to substantially occupy the entire entrance to each socket and the trailing ends of the grommets are of a shape and color to harmonize with the component with which they are associated. As a result, no attention is called to the plugs 20 and 22, the handset 10, handset cord 18, and base 14 having essentially the same appearance as a handset, handset cord and base in which a plug and socket arrangement is not employed. The plug and socket arrangement is thereby concealed from the subscriber removing the temptation for him to tamper with the connections.

Figure 5B:
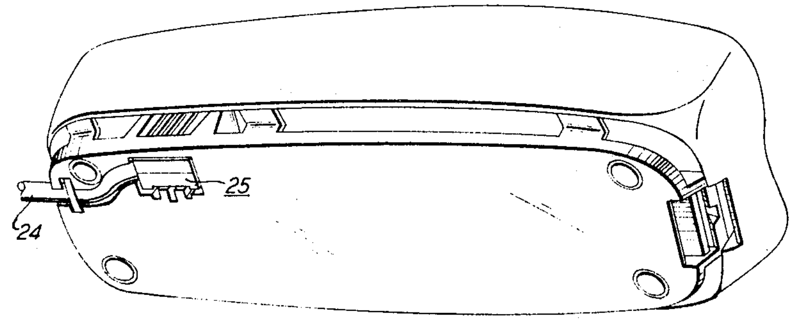
FIG. 5B is an enlarged perspective view showing the plug inserted into the socket.

Turning now to FIG. 5B, it is seen that when the plug 25 is fully inserted within the socket 16 in the underside of the base 14, the entire plug is positioned within the socket. Only the trailing end of the plug 25 is visible, and it is substantially flush with the surrounding surface. Hence, here too the plug and socket arrangement is concealed from the subscriber.

The line cord 24, which extends into the interior of the plug 25 through its side, is threaded into a groove in the underside of the base 14, the cord exiting from the end of the base. Consequently no grommet is needed to prevent severe bending at the junction of the cord with the plug.

It should be apparent from the foregoing that the term "concealed" as herein employed includes both concealment by camouflage, that is, harmonizing with the surroundings, and concealment by withdrawal from observation.

Although a specific embodiment of the invention has been shown and described, it will be understood that it is but illustrative and that various modifications may be made therein without departing from the scope and spirit of this invention as defined in the appended claims.

What is claimed is:

1. A telephone set comprising:
a handset having a socket therewithin, only the entrance of which is exposed to the exterior of the handset;
a base for accommodating the handset, the base having a pair of spaced sockets therewithin, only the entrances of which are exposed to the exterior of the base;
a handset cord having a plug on each end thereof, one plug being accommodated by the socket in the handset and the other plug being accommodated by one of the sockets in the base, each plug being concealed when fully inserted into a socket;
a line cord having a plug at one end thereof, the plug being accommodated by the other of the sockets in the base and being concealed when fully inserted therein; and
latch means associated with each plug, the latch means of each plug cooperating with the socket in which the plug is inserted to latch the plug in place when the plug is properly seated within the socket, the latch means being completely inside the socket when the plug is properly seated within the socket.

2. A telephone set comprising:
a handset having a socket therewithin, only the entrance of which is exposed to the exterior of the handset;
a base for accommodating the handset, the base having a socket therewithin, only the entrance of which is exposed to the exterior of the base;
a handset cord having a plug on each end thereof, one plug being accommodated by the socket in the handset and the other plug being accommodated by the socket in the base, each plug being concealed when fully inserted into a socket and each plug including means that cooperates with the socket in which it is inserted to latch the plug in place when the plug is fully inserted into the socket, the latch means being completely inside the socket when the plug is fully inserted into the socket.

3. A telephone set comprising:
a handset having a socket therewithin, only the entrance of which is exposed to the exterior of the handset;
a base for accommodating the handset, the base having a pair of spaced sockets therewithin, only the entrances of which are exposed to the exterior of the base;
a handset cord having a plug on each end thereof, one plug being accommodated by the socket in the handset and the other plug being accommodated by one of the sockets in the base, each plug being concealed when fully inserted into a socket;
a line cord having a plug at one end thereof, the plug being accommodated by the other of the sockets in the base and being concealed when fully inserted therein;
each socket having a ridge adjacent to its entrance, the ridge extending generally parallel to the entrance, and including a channel extending therethrough generally normal to the entrance; and
each plug having a detent secured thereto intermediate the ends of the plug and extending toward the cord end of the plug, the detent being biased away from the plug whereby when the plug is fully inserted into the socket, the detent moves behind the ridge and prevents the plug from being removed from the socket but a tool may be inserted through the channel to deflect the detent toward the plug to permit removal of the plug from the socket.

References Cited

UNITED STATES PATENTS

| | | | |
|---|---|---|---|
| 606,285 | 6/1898 | Gustafson | 179—100 |
| 283,747 | 8/1883 | Belcher | 179—100 |
| 2,895,119 | 7/1959 | Montgomery | 339—74 |
| 3,293,375 | 12/1966 | Lohs | 179—100 |

KATHLEEN H. CLAFFY, *Primary Examiner.*

J. S. BLACK, *Assistant Examiner.*

U.S. Cl. X.R.

339—91